United States Patent
Kokudo et al.

(10) Patent No.: US 10,656,319 B2
(45) Date of Patent: May 19, 2020

(54) LIQUID CRYSTAL DISPLAY DEVICE

(71) Applicant: NS MATERIALS INC., Fukuoka (JP)

(72) Inventors: Shingo Kokudo, Chikushino (JP); Eiichi Kanaumi, Chikushino (JP)

(73) Assignee: NS MATERIALS INC., Fukuoka (JP)

( * ) Notice: Subject to any disclaimer, the term of this patent is extended or adjusted under 35 U.S.C. 154(b) by 0 days.

(21) Appl. No.: 14/770,909

(22) PCT Filed: Jan. 28, 2014

(86) PCT No.: PCT/JP2014/051774
§ 371 (c)(1),
(2) Date: Aug. 27, 2015

(87) PCT Pub. No.: WO2014/132726
PCT Pub. Date: Sep. 4, 2014

(65) Prior Publication Data
US 2016/0011355 A1      Jan. 14, 2016

(30) Foreign Application Priority Data

Feb. 28, 2013    (JP) ................. 2013-040134

(51) Int. Cl.
*F21V 8/00*    (2006.01)
*G02F 1/1335*    (2006.01)
*G02F 1/13357*    (2006.01)

(52) U.S. Cl.
CPC ........... *G02B 6/003* (2013.01); *G02B 6/0023* (2013.01); *G02B 6/0073* (2013.01);
(Continued)

(58) Field of Classification Search
None
See application file for complete search history.

(56) References Cited

U.S. PATENT DOCUMENTS 6,890,777 B2 *    5/2005  Bawendi ............... B82Y 10/00
                                                    438/22
8,508,126 B1 *    8/2013  Morejon ................. F21V 9/16
                                                    313/46
(Continued)

FOREIGN PATENT DOCUMENTS

JP    H08-7614 A    1/1996
JP    2001-174816 A    6/2001
(Continued)

OTHER PUBLICATIONS

Search report and Written Opinion from PCT/JP2014/051774, dated Apr. 22, 2014.

*Primary Examiner* — Edward J Glick
*Assistant Examiner* — David Y Chung
(74) *Attorney, Agent, or Firm* — Greenblum & Bernstein, P.L.C.

(57) ABSTRACT

There is provided a high-efficiency and high-definition liquid crystal display device in which a white light source is constituted by using a fluorescent substance composed of a quantum dot having a minute particle size, and an LED light-emitting element, light from the light source is allowed to be incident from one lateral surface of a backlight provided on a rear surface of the liquid crystal display device, and thus an amount of the quantum dot fluorescent substance that is used is reduced, and the thickness of the liquid crystal display device is made smaller as a whole.

5 Claims, 7 Drawing Sheets

(52) U.S. Cl.
CPC ...... *G02F 1/1336* (2013.01); *G02F 1/133603* (2013.01); *G02F 1/133615* (2013.01); *G02F 2001/133614* (2013.01); *G02F 2202/108* (2013.01); *G02F 2202/36* (2013.01)

(56) References Cited

U.S. PATENT DOCUMENTS

| | | | | |
|---|---|---|---|---|
| 8,724,054 | B2* | 5/2014 | Jones | H01L 33/50 |
| | | | | 313/110 |
| 9,500,323 | B2* | 11/2016 | Wu | G02B 19/0028 |
| 2004/0025634 | A1 | 2/2004 | Nakamura et al. | |
| 2006/0103589 | A1 | 5/2006 | Chua et al. | |
| 2006/0146573 | A1* | 7/2006 | Iwauchi | G02B 6/0018 |
| | | | | 362/621 |
| 2006/0244358 | A1* | 11/2006 | Kim | C09K 11/025 |
| | | | | 313/486 |
| 2008/0084706 | A1* | 4/2008 | Roshan | B82Y 20/00 |
| | | | | 362/601 |
| 2009/0213296 | A1* | 8/2009 | Park | G02F 1/133603 |
| | | | | 349/62 |
| 2010/0193806 | A1 | 8/2010 | Byun | |
| 2010/0208490 | A1* | 8/2010 | Tsuchiya | G02B 6/003 |
| | | | | 362/606 |
| 2012/0287355 | A1* | 11/2012 | Oya | G02B 6/0031 |
| | | | | 348/790 |
| 2012/0313045 | A1* | 12/2012 | Shim | C09D 7/1275 |
| | | | | 252/301.36 |
| 2013/0020931 | A1* | 1/2013 | Ko | C09K 11/0883 |
| | | | | 313/503 |
| 2013/0070168 | A1* | 3/2013 | Yokota | H04N 7/00 |
| | | | | 348/790 |
| 2013/0215336 | A1* | 8/2013 | Miyata | G02B 6/003 |
| | | | | 348/790 |
| 2014/0240644 | A1* | 8/2014 | Abe | G02B 6/0088 |
| | | | | 349/71 |

FOREIGN PATENT DOCUMENTS

| | | |
|---|---|---|
| JP | 2003-225900 A | 8/2003 |
| JP | 2005-023704 A1 | 3/2005 |
| JP | 2008-112154 A | 5/2008 |
| JP | 2010-177656 A | 8/2010 |
| JP | 2012-22028 A | 2/2012 |
| WO | 2012/021643 A2 | 2/2012 |
| WO | 2012/023679 A1 | 2/2012 |

* cited by examiner

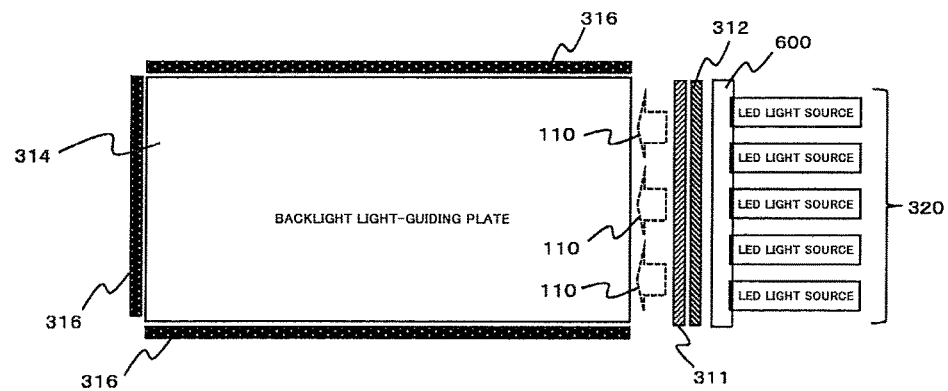
FIG. 5(a)
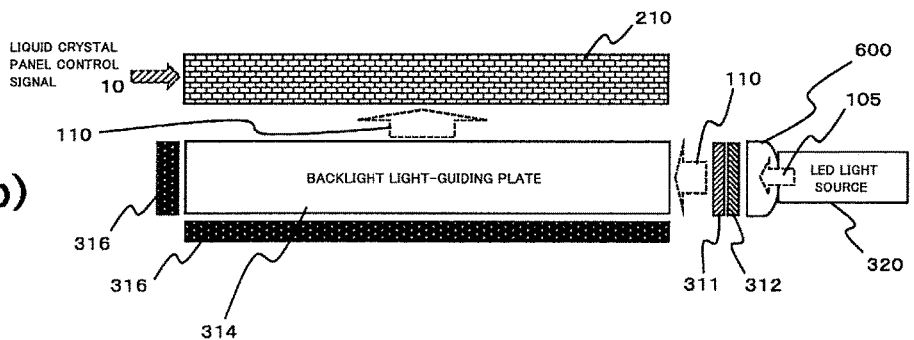
FIG. 5(b)
FIG. 6
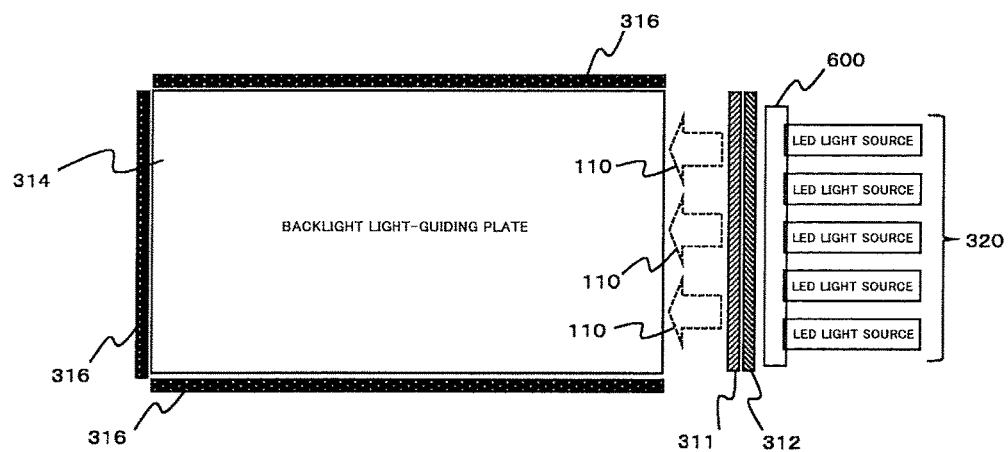

LIQUID CRYSTAL DISPLAY DEVICE

TECHNICAL FIELD

The present invention relates to a high-efficiency and high-definition liquid crystal display device in which a backlight is constructed by using a fluorescent substance composed of a quantum dot, and an LED light-emitting element, and which has an inexpensive structure.

BACKGROUND ART

The liquid crystal display device is a display device using a liquid composition. The liquid crystal display device is widely used as a display device in various apparatuses, particularly, as an information display device and an image display device. The liquid crystal display device displays an image by transmitting or blocking light for each region on the basis of application of a voltage. Accordingly, external light is necessary for display of an image on the liquid crystal display device. Accordingly, a backlight, which is provided on a rear surface of the liquid crystal display device, is used as a light source. The backlight is used to irradiate the entirety of the liquid crystal display device with white light, and a cold-cathode tube has been used as a backlight light source in the related art. Recently, a light-emitting diode (LED) is also used instead of the cold-cathode tube for the reason of a long operational lifespan, excellent coloring, and the like.

However, recently, a nano-sized fluorescent substance using a quantum dot is made into a product mainly by a venture company at abroad. The quantum dot is a conductive crystal which is formed to trap an electron in a minute space and has a size of several nanometers or less. When being trapped by the quantum dot, the electron only exists as a standing wave with a discrete wavelength. Therefore, energy of the electron becomes discrete. When the quantum dot emits and absorbs a photon, an energy level of the electron varies. In addition, the energy of the photon, which is emitted or absorbed by the quantum dot, varies depending on a crystal size of the quantum dot (quantum size effect). Accordingly, quantum dots having various fluorescent colors can be manufactured. The fluorescent substance composed of the quantum dot is used, for example, as a fluorescent marker in a biotechnology.

As a method of synthesizing the quantum dot, for example, there is known a method in which a precursor-containing solution for formation of particles is continuously supplied to the inside of a reactor disposed in a heating zone, rapid heating is carried out up to a reaction initiation temperature, and rapid cooling is carried out after allowing a reaction to occur (for example, refer to Patent Literature 1 and Patent Literature 2).

However, in the majority of LEDs for both a backlight and illumination, a blue LED is covered with a fluorescent substance for fluorescent light-emission, and a desired light-emission color is obtained by using the light-emission. In the related art, as the fluorescent substance, dope-type light-emitting particles, which contain an oxide as a main component and has a size of several micrometers to several tens of micrometers, are used. A particle size of the fluorescent substance is as large as 10 or more times a wavelength of visible light (approximately 360 nm to 830 nm), and thus there is a problem in that scattering of light is likely to occur in a particle surface of the fluorescent substance, and an energy loss occurs. In addition, only a surface of the fluorescent substance contributes a wavelength variation of light, and thus there is also a problem in that optical conversion for the volume of the fluorescent substance particles is not efficient.

In addition, with regard to the dope-type light-emitting particles, there is a problem in that a light-emitting wavelength, light-emitting intensity, and temperature dependency are approximately fixed in accordance with a kind of a dopant (light-emitting ion, atom). Further, there is a problem in that a material capable of obtaining light-emitting intensity for practical use is limited. In addition, an excitation wavelength and a fluorescent wavelength correspond to each other in a one-to-one manner. Accordingly, a fluorescent substance capable of being used at one excitation wavelength is limited, and thus there is a problem in that the degree of freedom of a color tone is low.

As described above, the fluorescent substance of the related art has a lot of problems when being used as an optical material. As a result, when using the fluorescent substance of the related art, the following problems are caused in a liquid crystal display device.

First, conversion efficiency into exciting light in a fluorescent substance, and extraction efficiency of the fluorescent substance are poor, and thus an energy loss increases. In addition, spectral characteristics of a color filter in a liquid crystal display device, and a wavelength of fluorescence do not match each other, and thus an additional energy loss occurs. Accordingly, power consumption of the liquid crystal display device increases more than necessary.

On the other hand, a liquid crystal display device, which uses the quantum dot as a fluorescent substance layer, is also suggested. For example, Patent Literature 4 suggests a liquid crystal display device in which the quantum dot is used as the fluorescent substance layer, and which has a small optical loss. In the liquid crystal display device described in Patent Literature 4, light from a light-emitting diode is incident to a backlight (a light-guiding plate), and light, which is scattered in the backlight, is incident to a layer including the quantum dot fluorescent substance and is converted to white light by using optical wavelength conversion characteristics of the quantum dot. The white light that is obtained is used to irradiate a liquid crystal panel to obtain color image information.

In this method, an energy loss is smaller in comparison to a liquid crystal display device of the related art in which large-sized dope-type light-emitting particles are used as a fluorescent substance, and it is possible to manufacture a liquid crystal display device with satisfactory color reproduction. However, in the method, it is necessary to form a fluorescent substance layer with a wide area similar to the backlight of the related art. Accordingly, the following problems and the like still exist. Specifically, it is necessary to use a lot of quantum dot fluorescent substances, it is necessary to apply a fluorescent substance to a wide area in a uniform concentration, and it is difficult to make the physical thickness of the liquid crystal display device small.

As a method of making the thickness of the backlight small, there is also suggested a method of reducing the thickness by employing a configuration in which light is incident from an end surface of the backlight. In Patent Literature 5, a plurality of light sources with light-emitting colors different from each other are used, and the light sources are disposed in a region (short side) having a narrow end surface instead of a wide surface of the backlight, thereby making the thickness of the device small.

However, in the method of Patent Literature 5, it is difficult to use a light source with a small size and high efficiency, and thus a cold-cathode tube is used. In addition, Patent Literature 5 also describes a configuration in which light-emitting diode light sources having a plurality of colors are used, but a specific structure thereof is not described. Patent Literature 5 discloses a method in which each color of light source is disposed at each of three short sides of the backlight, but in the method, three sides of the backlight are used as a light source, and three kinds of light sources are necessary. Accordingly, it is possible to make the periphery of the liquid crystal display device in a planar direction narrow, but the backlight becomes expensive.

In addition, in the fluorescent substance layer obtained by the method of using the dope-type fluorescent substance particles in the related art, the size of the fluorescent substance particles is as large as 10 or more times the wavelength of visible light (approximately 360 nm to 830 nm), and thus scattering and reflection of light due to the fluorescent substance particles are great. Accordingly, an optical loss at the fluorescent substance layer is large. Therefore, it is necessary to emit strong light so as to compensate the optical loss due to the fluorescent substance layer, and thus there are problems in that an operational lifespan shortens due to an increase in heat generation in the light-emitting diode, an operational lifespan of the fluorescent substance layer shortens due to exposition of the fluorescent substance to the strong LED light, and the like. Accordingly, it is difficult to provide the fluorescent substance layer in a region with a narrow area which is close to the LED. In the dope-type light-emitting element, a light-emitting wavelength and the like are fixed in accordance with the kind of a dopant, and thus it is difficult to allow the excitation wavelength and the light-emitting wavelength to match each other, and as a result, light-emitting efficiency is low. Particularly, this problem becomes significant in the vicinity of red light.

CITATION LIST

Patent Literatures

Patent Literature 1: JP 2003-225900 A
Patent Literature 2: JP 2005-023704 T
Patent Literature 3: JP 8-7614 A
Patent Literature 4: JP 2012-22028 A
Patent Literature 5: JP 2001-174816 A

SUMMARY OF INVENTION

Technical Problem

The invention provides means for solving the above-described problems, and an object thereof is to a liquid crystal display device which uses a fluorescent substance composed of a quantum dot having a minute particle size of 50 nm or less shorter than a wavelength of visible light, and in which an optical loss in a fluorescent substance layer is greatly reduced, and as a result, an output of an LED light-emitting element is reduced and an operational lifespan is lengthened. In addition, another object of the invention is to provide a liquid crystal display device in which the fluorescent substance layer can be provided between an LED light-emitting element and a light-guiding plate, and an amount of a quantum dot fluorescent substance that is used can be reduced. In addition, still another object of the invention is to provide a liquid crystal display device in which the fluorescent substance layer can be provided immediately after an LED light source, an area of the fluorescent substance layer can be reduced, efficiency is high, and the physical device thickness is small, and which is inexpensive.

Solution to Problem

The above-described problem can be solved by using a quantum dot fluorescent layer in which a particle size is smaller than an optical wavelength, and a loss is lower with respect to wavelength light, and by changing positions of a backlight, a fluorescent substance layer, and an LED light-emitting element from those in the liquid crystal display device of the related art. The fluorescent substance layer that is used herein is a thin film in which a quantum dot having a particle size of 50 nm or less is used as a fluorescent substance.

That is, the present invention relates to a liquid crystal display device, including: a liquid crystal panel; a light source; a light-guiding plate which is provided on a rear surface of the liquid crystal panel and irradiates the liquid crystal panel with light that is derived from the light source; and a fluorescent substance layer which is disposed between the light-guiding plate and the light source and includes a quantum dot fluorescent substance having a diameter of 50 nm or less on an inner side of the fluorescent substance layer. More specifically, it is preferable to include a liquid crystal panel including a color filter, a backlight in which an LED is set as a light source, and which irradiates the liquid crystal panel with light from a rear surface side of the liquid crystal panel through a light-guiding plate, and a fluorescent substance layer which is disposed between the light-guiding plate and the light source and includes a quantum dot fluorescent substance having a diameter of 50 nm or less on an inner side.

The liquid crystal display device of the invention has the following configuration. First, light from an LED (for example, blue) is incident to the fluorescent substance layer including a quantum dot, and optical wavelength conversion is carried out therein. Then, the light of which a wavelength is converted is mixed with incident light, and thus white light is formed. The white light is incident to a backlight surface. The fluorescent substance layer may have a configuration in which fluorescent substance layers, which emit red light R and green light G, are laminated, or quantum dots capable of producing a plurality of colors are mixed in one layer to constitute a film. Light, which is obtained by synthesizing light generated from each of the quantum dot, becomes white light.

It is necessary to reduce a heat loss by effectively using light from the LED as much as possible in order for the light to be incident from a short side of the backlight and so as to carry out wavelength conversion by using a fluorescent film having a small area. The reduction in a heat loss can be accomplished by constructing a fluorescent substance layer in which a particle size of fluorescent substance particles relating to the wavelength conversion is sufficiently smaller than an optical wavelength. On the other hand, according to necessity, a configuration, in which light is incident from a plurality of sides of the backlight, is also possible. In this case, it is possible to construct a backlight of which luminous intensity is more uniform in a surface direction.

According to the above-described configuration, an area of the fluorescent substance layer decreases, and thus it is possible to reduce an optical loss. In addition, a uniform application area is small, and thus an area is small. Accordingly, it is easy to construct a uniform fluorescent substance layer, and it is possible to obtain a backlight with good quality at a low cost. The film thickness of the fluorescent substance layer is several micrometers, but various film thicknesses may be selected in accordance with mounting.

In addition, the optical loss in the fluorescent substance layer is small, and thus it is possible to dispose a plurality of fluorescent substance layers at the same position or at positions adjacent to each other, and it is possible to carry out decomposition into not only RGB three primary colors but also spectrums of four colors, five colors, and the like. In addition, it is also possible to realize more multi-coloring in comparison to a color filter of a liquid crystal panel. According to this, it is possible to construct a color liquid crystal display device with high color reproducibility in multi primary colors greater than three primary colors.

In the liquid crystal display device of the invention, it is preferable that light from the light source, of which a wavelength is converted by the fluorescent substance layer, be incident to at least one lateral surface of the light-guiding plate, and be scattered to the inside of the light-guiding plate to irradiate the liquid crystal panel with the light.

It is preferable that the fluorescent substance layer be constituted by a plurality of fluorescent substance layer members in which a wavelength of light, which is obtained through wavelength conversion, is different in each case.

It is preferable that the light source be constituted by an LED, and a lens, which changes a direction of light generated from the light source, be provided between the light source and the fluorescent substance layer. It is preferable that a liquid crystal display device include a liquid crystal panel, an LED light source, a light-guiding plate which is provided on a rear surface of the liquid crystal panel and irradiates the liquid crystal panel with light, and a lens which is provided between the light-guiding plate and the light source and changes a direction of light generated from the light source. It is preferable that a quantum dot fluorescent substance having a diameter of 50 nm or less be contained at the inside of the lens. When a particle size is greater than 50 nm, the particle size is close to a wavelength of visible light, and thus scattering and reflection of the light due to fluorescent substance particles becomes significant, and thus a loss tends to increase.

With regard to the fluorescent substance layer, it is preferable that a light transmitting object be disposed on a front surface of the LED light source, and a quantum dot having a diameter of 50 nm or less be diffused to the inside of the light transmitting object so as to diffuse light that is incident to the fluorescent substance layer from the LED light source, thereby allowing the fluorescent substance layer to operate as a fluorescent substance layer that carries out wavelength conversion of incident light.

It is preferable that the fluorescent substance layer include a plurality of fluorescent substance layers for conversion to other wavelengths of three or more wavelengths.

It is preferable that the LED be an LED in which a wavelength of light that is emitted is shorter in comparison to a blue LED, a violet LED, or the blue LED and the violet LED.

The present invention also relates to a fluorescent substance layer that is applied to a liquid crystal display device including a liquid crystal panel, a light source, a light-guiding plate which is provided on a rear surface of the liquid crystal panel and irradiates the liquid crystal panel with light that is derived from the light source, and a fluorescent substance layer that is disposed between the light-guiding plate and the light source. The fluorescent substance layer contains a quantum dot fluorescent substance having a diameter of 50 nm or less at an inner side of the fluorescent substance layer.

Advantageous Effects of Invention

According to the above-described configuration, it is possible to realize a high-efficiency and high-definition liquid crystal display device in which an amount of a quantum dot fluorescent substance that is used is small, and which has a very thin structure. In the liquid crystal display device, only a single-color LED can be used as a light source, and thus the degree of freedom in a structure is high, and the thickness of the liquid crystal display device can be made to be smaller. In addition, it is possible to freely adjust a color tone in accordance with selection of a fluorescent substance.

BRIEF DESCRIPTION OF THE DRAWINGS

FIGS. 5(a) and 5(b) are diagrams illustrating an example of a specific structure of a liquid crystal display device according to a second embodiment of the invention.

FIG. 6 is a layout diagram when the liquid crystal display device according to the second embodiment of the invention is seen from a backlight light-guiding plate surface side.

DESCRIPTION OF EMBODIMENTS

Hereinafter, description will be given of preferred examples of the invention. On the other hand, the following embodiment id illustrative only, and it is needless to say that the embodiment of the invention can be appropriately modified in a range not departing from the gist of the invention.

The liquid crystal display device according to the invention includes a liquid crystal panel including a color filter, a light-guiding plate which uses an LED light-emitting element provided on a short side of a backlight as a light source, and which irradiates the liquid crystal panel with light on a rear surface side of the liquid crystal panel, and a fluorescent substance layer which is provided on a propagation path of light that is emitted from the LED light source, and which includes a fluorescent substance composed of a quantum dot having a particle size of 50 nm or less that is shorter than a wavelength of visible light on an inner side.

Here, examples of the liquid crystal display device according to the invention include an independent display device provided with a terminal through which an image signal is input, and a display which is provided to an electronic apparatus and the like and which functions as a display screen of the electronic apparatus.

In addition, in the invention, the fluorescent substance composed of a quantum dot is a fine particle having a particle size of 50 nm or less that is shorter than a wavelength of visible light, and absorbs a photon of a specific wavelength and emits a photon of another wavelength.

In addition, the fluorescent substance layer in the invention is a layer in which the fluorescent substance is sealed with a sealing agent that transmits at least a part of light. The film thickness of the fluorescent substance layer is approximately 10 μm or less, but there is no limitation thereto.

Light that is emitted from the LED light source is incident to the fluorescent substance layer. The light that is incident to the fluorescent substance layer excites an electron inside the fluorescent substance. When the electron returns to a ground state, the fluorescent substance emits light of a wavelength which is specific to the fluorescent substance. This phenomenon is called fluorescence. Accordingly, the wavelength of light, which is transmitted through the fluorescent substance layer, is changed. Among light beams which are transmitted through the fluorescent substance layer, a part of light beams which are transmitted through the backlight is radiated from a surface of the liquid crystal display device. According to this, an image is displayed on the liquid crystal display device.

Figure 1:
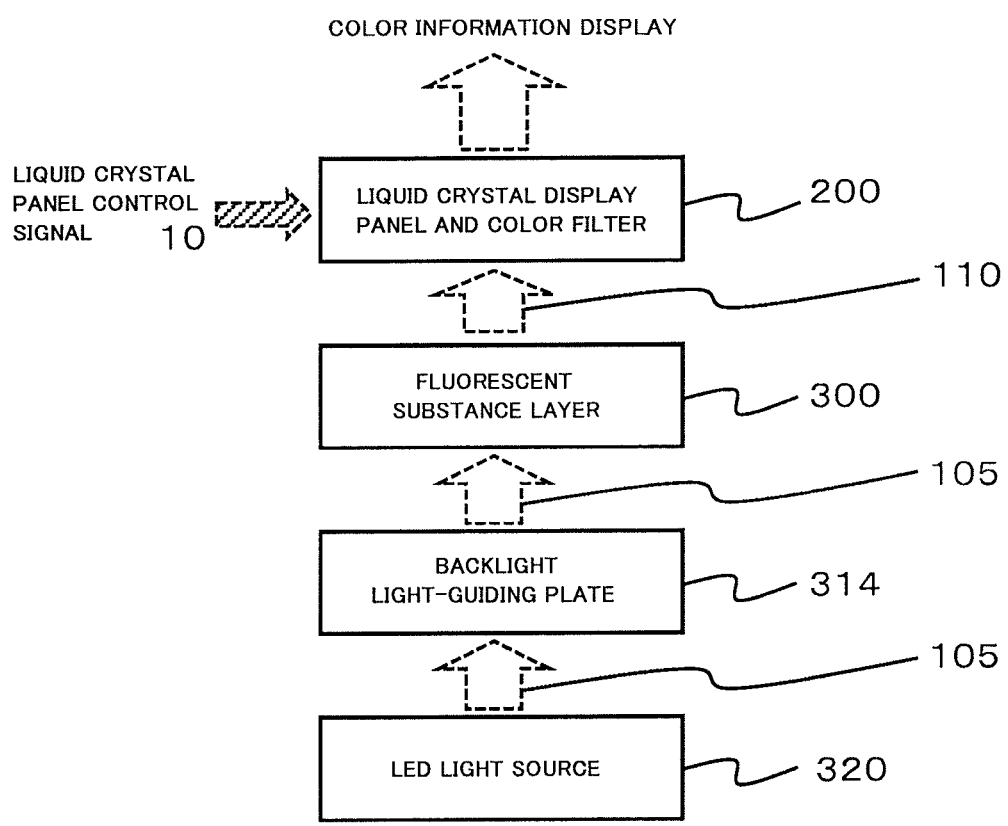
FIG. 1 is a diagram illustrating the outline of a configuration of a liquid crystal display device of the related art.

FIG. 1 is a diagram illustrating a structure of a liquid crystal display device in which a backlight is constructed by using an LED light source (320) and a backlight light-guiding plate (314) which are typically used, and a fluorescent substance layer (fluorescent substance layer including particles having a particle size of several micrometers to several tens of micrometers) (300) using a fluorescent substance having a large particle size. Light emitted from the LED light source (320) is transmitted through the backlight light-guiding plate (314), the fluorescent substance layer (300), and a liquid crystal display panel (200) in this order. In the liquid crystal display device, light (light from an LED light-emitting element (for example, a blue wavelength)) (105) from the LED light source (320) (for example, blue) is first incident to the backlight light-guiding plate (314), and is scattered in the backlight light-guiding plate (314). In addition, light (105), which is scattered, is output from a single surface (single surface on a wide surface side) of the backlight light-guiding plate (314), and is transmitted through a single or a plurality of fluorescent substance layers (300) which are laminated on the single surface, thereby becoming white light (110). The reason for the above-described configuration is as follows. The fluorescent substance particles of the fluorescent substance layer (300) are as large as several micrometers to several tens of micrometers, and thus an optical loss due to scattering of light occurs, and it is difficult to use the strong LED light source. In addition, the above-described configuration is employed to provide the fluorescent substance layer (300) on a surface in which light is diffused and the intensity of light is reduced. An amount of loss is approximately 70% of incident light, and disappears as heat. Only 30% of the incident light, which is transmitted through the fluorescent substance layer (300) after wavelength conversion therein, is used as the white light (110) for irradiation of the liquid crystal panel.

When a liquid crystal control signal (10) or an image signal is input to the liquid crystal display panel (200) from an external control circuit, various kinds of information can be displayed on a screen of the liquid crystal display panel (200). The same shall apply hereinafter with respect to FIG. 2 to FIG. 5(b), and FIG. 7 to FIG. 9.

Figure 2:
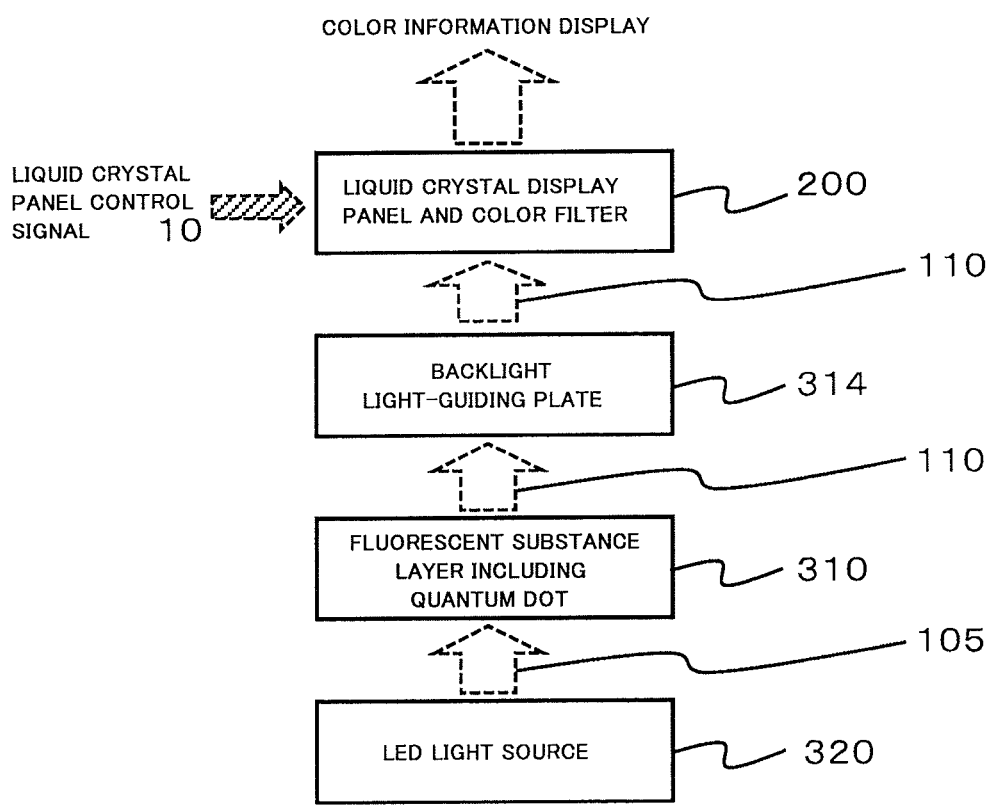
FIG. 2 is a diagram illustrating the outline of a configuration of a liquid crystal display device according to an embodiment of the invention.

FIG. 2 is a diagram illustrating a basic concept of the liquid crystal display device according to an embodiment of the invention. FIG. 2 illustrates a structure of the liquid crystal display device that is constructed by using a fluorescent substance layer (fluorescent substance layer including a quantum dot having a particle size of 50 nm or less) (310) using a quantum dot. The liquid crystal display device of the invention uses a minute quantum dot having a particle size of 50 nm or less as a fluorescent substance, and an LED light source (320), a fluorescent substance layer (310), a backlight light-guiding plate (314), and a liquid crystal display panel (200) are disposed in this order. A backlight is constituted by the LED light source (320), the fluorescent substance layer (310), and the backlight light-guiding plate. In the invention, light (105) that is emitted from the LED light source (320) is wavelength-converted to white light (110) in the fluorescent substance layer (310) including a quantum dot, and is incident to the backlight light-guiding plate (314). In addition, the incident white light (110) is scattered in the backlight light-guiding plate (314), and the liquid crystal panel is irradiated with the white light (110) from a rear surface side thereof. In addition, color image information is displayed for an observer.

The quantum dot that is used in the invention has a diameter of several nanometers to several tens of nanometers, and is 50 nm to the maximum, and thus an optical loss due to scattering of light on a particle surface is very small. Accordingly, it is possible to set the intensity of the light (105), which is emitted from the LED light source (320), to be weaker than that of an LED light-emitting element of the backlight device in the related art. At this time, when the fluorescent substance layer (310) is provided before the backlight light-guiding plate (314), specifically, on a short side of the backlight light-guiding plate (314) instead of a wide surface of the backlight light-guiding plate (314), an area of the fluorescent substance layer (310) using the quantum dot is made to be smaller, and thus it is possible to reduce an amount of the quantum dot that is used. Further, according to this arrangement, it is not necessary to dispose the fluorescent substance layer on a wide surface of the backlight light-guiding plate (314) which is used for arrangement of the fluorescent substance layer in the related art, and thus it is possible to reduce an amount of quantum dot that is used, and thus it is possible to make the thickness of the liquid crystal display device as a whole. The particle size of the quantum dot, which ranges from several nanometers to several tens of nanometers, can be measured by a transmission electron microscope, and as the transmission electron microscope, an apparatus capable of obtaining a resolution up to 0.2 nm is typically available.

Figure 3:
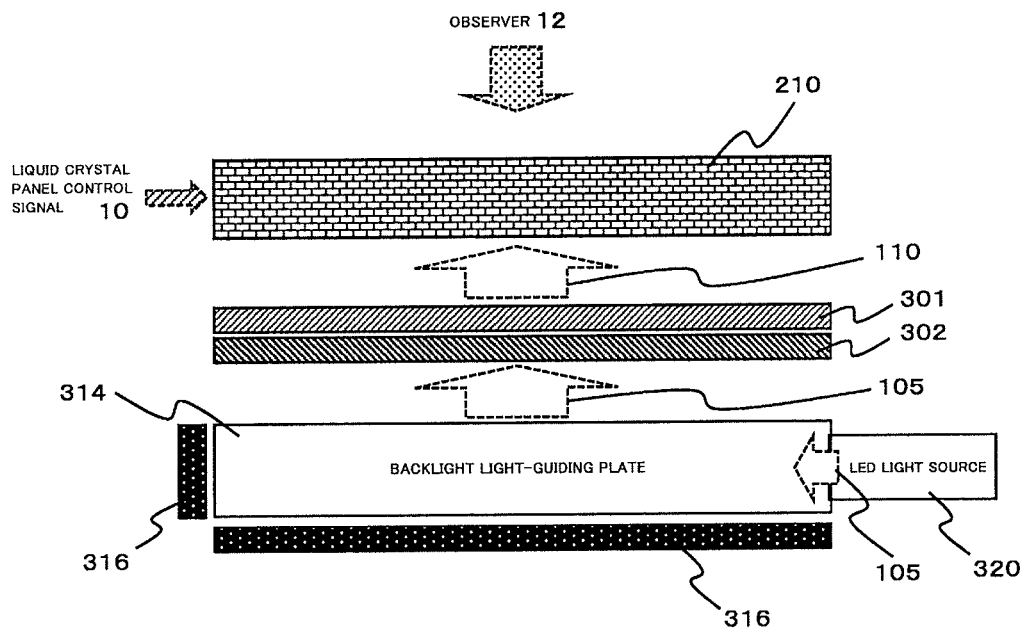
FIG. 3 is a diagram illustrating an example of a specific structure of the liquid crystal display device of the related art.

FIG. 3 is a diagram illustrating an example of a specific structure of the liquid crystal display device of the related art in FIG. 1 for explanation of a difference from the liquid crystal display device of the invention. In FIG. 3, light (105), which is emitted from the LED light source (320) on the right side, is incident to the backlight light-guiding plate (314), and the light is scattered in the backlight light-guiding plate (314). The light (105), which is incident to the backlight light-guiding plate (314), is the light (105) emitted from the LED light-emitting element (320), and a wavelength thereof is not changed.

FIG. 3 illustrates a vertical cross-sectional structure of the entirety of the liquid crystal display device, and thus the backlight light-guiding plate (314) has a rectangular wide plate shape, and a plurality of the LED light sources (320) are arranged along one side of the light-guiding plate. So as to use the light (105), which is scattered inside the backlight light-guiding plate (314), as much as possible, an optical reflective plate (316) is provided on the bottom and a lateral surface of the backlight light-guiding plate (314).

On the other hand, a fluorescent substance layer (fluorescent substance layer (red) including particles having a particle size of several micrometers to several tens of micrometers) (301) including a fluorescent substance having a large particle size in the related art, and a fluorescent substance layer (fluorescent substance layer (green) including particles having a particle size of several micrometers to several tens of micrometers) (302) including a fluorescent substance having a large particle size in the related art are provided on a surface opposite to the bottom of the backlight light-guiding plate (314). The fluorescent substance layers (301, 302) are constituted by one sheet or a plurality of sheets of layers in which fluorescent colors are different from each other. The light (105) from the backlight light-guiding plate (314) is transmitted through the fluorescent substance layers (301, 302), and the scattered light that is transmitted therethrough is subjected to optical wavelength conversion in the fluorescent substance layers (301, 302), and becomes white light (110) as a whole. The white light (110) is emitted to the rear surface of the liquid crystal panel (210). In addition, when a liquid crystal control signal (10) or an image signal is input to the liquid crystal display panel from an external control circuit, image information is displayed on a screen of the liquid crystal display panel, and an observer (12) can view the image information.

Figure 4:
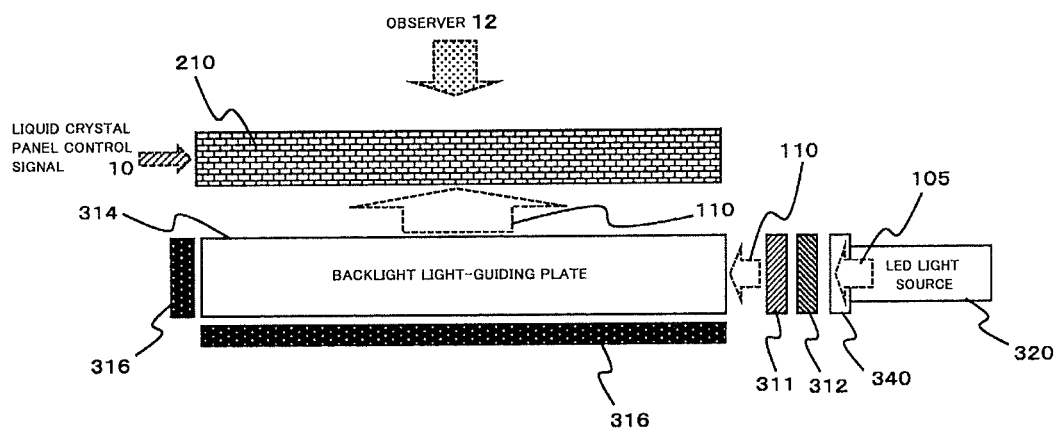
FIG. 4 is a diagram illustrating an example of a specific structure of the liquid crystal display device according to the embodiment of the invention.

FIG. 4 is a configuration example in which details of the liquid crystal display device according to the invention are described. In the invention, a quantum dot having a very small particle size, specifically, a quantum dot having a particle size of 50 nm or less is used as the fluorescent substance, and thus the invention is characterized in that the optical loss in a fluorescent substance layer (fluorescent substance layer (red) including a quantum dot having a particle size of 50 nm or less) (311), and a fluorescent substance layer (fluorescent substance layer (green) including a quantum dot having a particle size of 50 nm or less) (312) can be made to be small. Accordingly, a heat loss can be made to be small. Since the optical loss is small, it is possible to suppress the optical output (105) of the LED light source (320) to approximately the half of the optical loss in the related art, and as a result, as illustrated in FIG. 4, it is possible to provide the fluorescent substance layers (311, 312) immediately after the LED light source (320). In the type of the invention, the light (105), which is emitted from the LED light source (320), is transmitted through an optical diffusion plate (340) formed from a thin transparent resin, and is immediately incident to the fluorescent substance layers (311, 312) that is constituted by a quantum dot. The optical diffusion plate (340) is configured to optically couple the fluorescent substance layers (311, 312), and the LED light source (320), and to retain a photon, and the thickness of the plate may be set to approximately several millimeters.

The light (105), which is incident to the fluorescent substance layers, is mixed after optical wavelength conversion by one or a plurality of sheets of fluorescent substance layers (311, 312), and becomes white light (110). Next, the white light (110) is incident to the backlight light-guiding plate (314), is scattered and spreads at the inside of the backlight light-guiding plate (314), and is emitted from a surface on one side to the rear surface of the liquid crystal panel (210) as the white light (110). In addition, as is the case with FIG. 3, when a liquid crystal control signal (10) or an image signal is input to the liquid crystal display panel from an external control circuit, image information is displayed on a screen of the liquid crystal display panel, and thus an observer (12) can view the image information.

In the backlight light-guiding plate (314), the optical reflective plate (316) is provided on a wide surface which is opposite to a surface facing the liquid crystal panel, and on a short surface that is opposite to the LED, and thus the scattered light is allowed to propagate to a surface of the liquid crystal panel (210) as much as possible without being wasted.

According to this configuration, it is possible to make the area of the fluorescent substance layers (311, 312) very small. According to this, in a liquid crystal display device with a large-sized screen, it is possible to greatly reduce an amount of a quantum dot fluorescent substance that is used. Further, the area is small, and thus it is also easy to form the quantum dot fluorescent substance layer with a uniform thickness. Further, replacement of the fluorescent substance layers (311, 312) and the LED light source portion is simple, and thus maintenance of the liquid crystal display device is convenient.

FIGS. 5(a) and 5(b) are diagrams illustrating a second example of the invention. A simple convex lens column (600) is constructed on an output surface of the LED light source (320) so as to couple the quantum dot fluorescent substance layers (311, 312) to the LED light source (320), thereby reducing a loss of the light (105) from the LED light source (320) as much as possible for effective use. According to the construction of the convex lens column (600), light, which is emitted from the LED light source (320), spreads and becomes similar to a parallel light beam. In addition, the quantum dot fluorescent substance layers (311, 312) are constructed on a front surface of the convex lens column (600) to convert the light of the LED light source to white light (110). Further, the optical reflective plate (316) is provided on a rear surface and three short sides of the backlight light-guiding plate (314) that faces the liquid crystal panel (210).

In FIGS. 5(a) and 5(b), the convex lens column (600) is described. However, as can be seen from FIG. 5(a) in which the liquid crystal display device is seen from a surface side of the backlight light-guiding plate (314), actually, in a depth direction, the convex lens column (600) is set as an elongated rod-shaped convex lens column (600) such as a cylindrical lens so as to arrange a plurality of the LED light sources (320) in a line.

FIG. 6 is a layout diagram in which arrangement of the backlight light-guiding plate (314), the fluorescent substance layers (311, 312), and the LED light source (320) of FIGS. 5(a) and 5(b) is seen from a surface of the liquid crystal display device. FIG. 6 illustrates a structure in which a plurality of the LED light sources (320) are directly arranged to the convex lens column (600), output light is converted to white light (110) with the fluorescent substance layers (311, 312) to form the same white light (110), and the white light (110) is incident to the backlight light-guiding plate (314).

Further, as is the case with FIGS. 5(*a*) and 5(*b*), the optical reflective plate (316) is provided on the rear surface and the three short sides of the backlight light-guiding plate (314).

Figure 7:
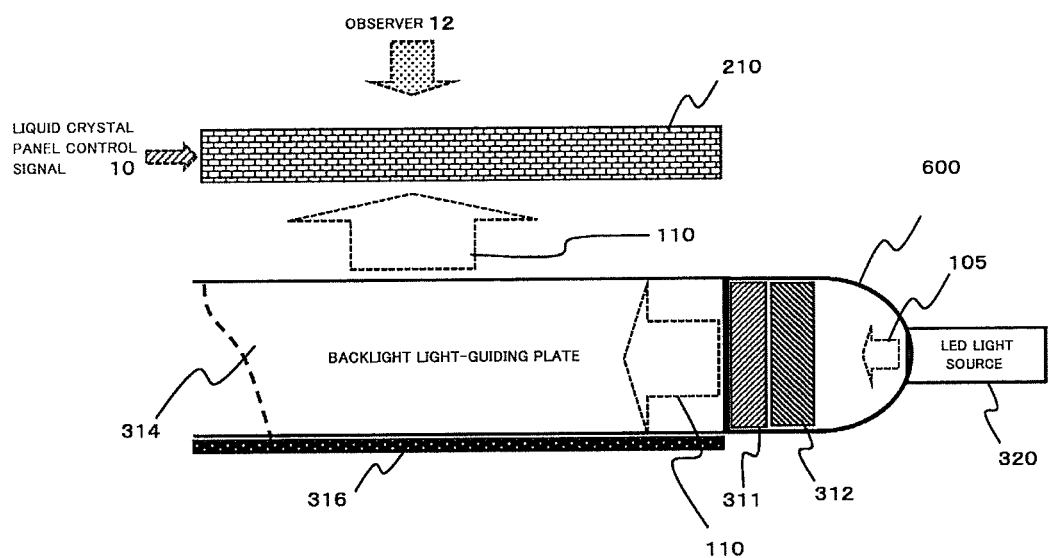
FIG. 7 is a diagram illustrating a specific method of mounting an LED light source, a fluorescent substance layer, and a backlight light-guiding portion in the liquid crystal display device according to the second embodiment of the invention.

FIG. 7 illustrates light source arrangement in the liquid crystal display device in FIGS. 5(*a*) and 5(*b*) according to a second embodiment of the invention in detail. Light (105), which is emitted from the LED light source (320), is transmitted through the convex lens column (600) and is incident to the fluorescent substance layers (311, 312), which include a quantum dot, on a front surface side of the convex lens column (600). In the fluorescent substance layers (311, 312), wavelength conversion is carried out with respect to the light, which is incident, through light emission of a fluorescent substance, and the incident light and the light that is converted with the fluorescent substance layers (311, 312) are synthesized to form white light (110). The white light (110), which is synthesized, enters the backlight light-guiding plate (314). The white light (110) is scattered in the backlight light-guiding plate (314), is diffused to the entirety of the light-guiding plate, and is output from the backlight light-guiding plate (314) to an outer side as the white light (110), and the liquid crystal panel (210) is irradiated with the light from a rear surface side thereof. In addition, as is the case with FIG. 3, when a liquid crystal control signal (10) or an image signal is input to the liquid crystal display panel from an external control circuit, image information is displayed on a screen of the liquid crystal display panel, and an observer (12) can view the image information.

This configuration is a configuration example in which a layer including a quantum dot is attached to a front surface of the lens. In FIG. 7, the number of layers of the fluorescent substance films (311, 312) is set to two (R: red, G: green). However, an additional fluorescent substance color layer may be constituted by changing a wavelength of a light source, or a multi-wavelength color liquid crystal display device of five or six colors instead of three colors may be configured for expression of a wider color area in comparison to a device in the related art. In this application example, it is necessary to set the number of fluorescent substance layers to five or six.

The white light (110) is incident to the backlight light-guiding plate (314), is diffused at the inside of the light-guiding plate, and is output in a direction in which a liquid plane surface exists. A configuration, in which the optical reflective plate (316) is provided on an opposite side of the backlight light-guiding plate (314) to suppress a loss of light in a direction opposite to the output direction, has been described. Further, when an outer side of the convex lens column (600) except for a surface, which comes into contact with the backlight light-guiding plate (314), is covered with an optical reflective material, it is possible to enhance efficiency. According to this configuration, the fluorescent substance layers (311, 312) can be configured integrally with the convex lens column (600). Accordingly, in addition to easy replacement during a malfunction, a decrease in thickness and size is realized, and thus it is possible to manufacture a very thin liquid crystal display device.

Figure 8:
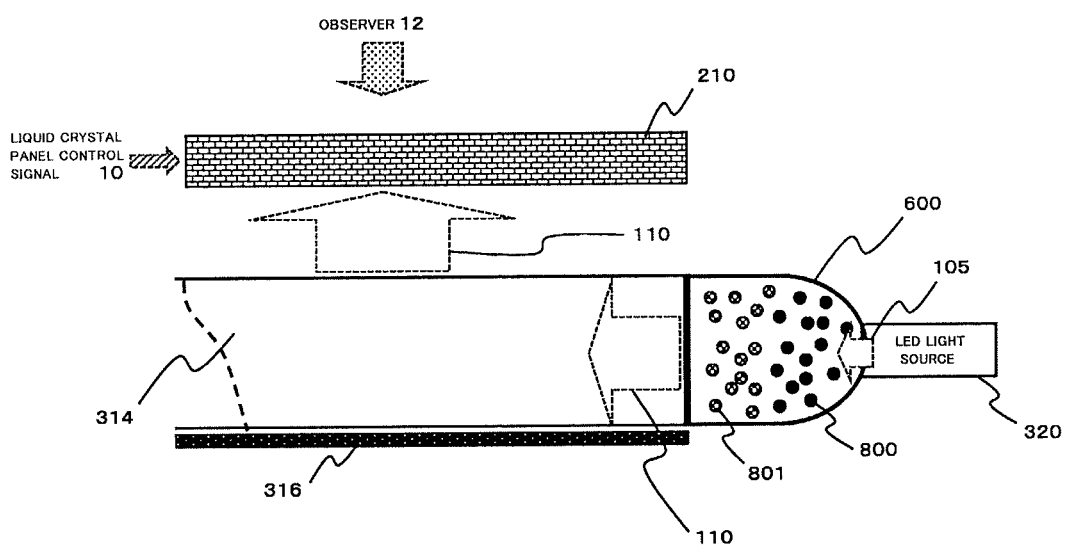
FIG. 8 is a diagram illustrating a specific method of mounting an LED light source, a fluorescent substance layer, and a backlight light-guiding portion in a liquid crystal display device according to a third embodiment of the invention.

FIG. 8 is a diagram illustrating a third embodiment of the invention. As illustrated in FIG. 8, the liquid crystal display device is provided with a convex lens column (600), in which fine quantum dot fluorescent substance particles of 50 nm or less are diffused in a transparent material, and has a wavelength conversion function with a fluorescent substance, as a fluorescent substance layer. In a case of using a blue LED, two kinds of wavelength conversion of red R and green G are necessary, and thus two kinds of quantum dot fluorescent substances such as a quantum dot fluorescent substance (quantum dot having a particle size of 50 nm or less (fluorescent substance particles) (red)) (800), and a quantum dot fluorescent substance (quantum dot having a particle size of 50 nm or less (fluorescent substance particles) (green)) (801) are included in the convex lens column (600).

In this configuration, the quantum dot fluorescent substance particles are diffused in the convex lens column (600) to form the convex lens column (600), and light (105) that is incident thereto from the LED light source (320) is subjected to wavelength conversion in the convex lens column (600), thereby forming white light (110). The white light (110) is incident to the backlight light-guiding plate (314), is diffused in the light-guiding plate, and is emitted in a direction in which a liquid crystal plane exists. As is the case with FIG. 3, when a liquid crystal control signal (10) or an image signal is input to the liquid crystal display panel from an external control circuit, image information is displayed on a screen of the liquid crystal display panel, and an observer (12) can view the image information. Further, the optical reflective plate (316) is provided on a rear surface of the backlight light-guiding plate (314) which is opposite to the liquid crystal panel (210), and three short sides except for a short side to which light from the LED element is incident, thereby suppressing a loss due to optical leakage.

According to this configuration, the quantum dot fluorescent substance particles (800, 801) are included in the convex lens column (600), and thus in addition to easy replacement of the light source portion during a malfunction, a decrease in thickness and size is realized, and thus it is possible to manufacture a very thin liquid crystal display device.

Figure 9:
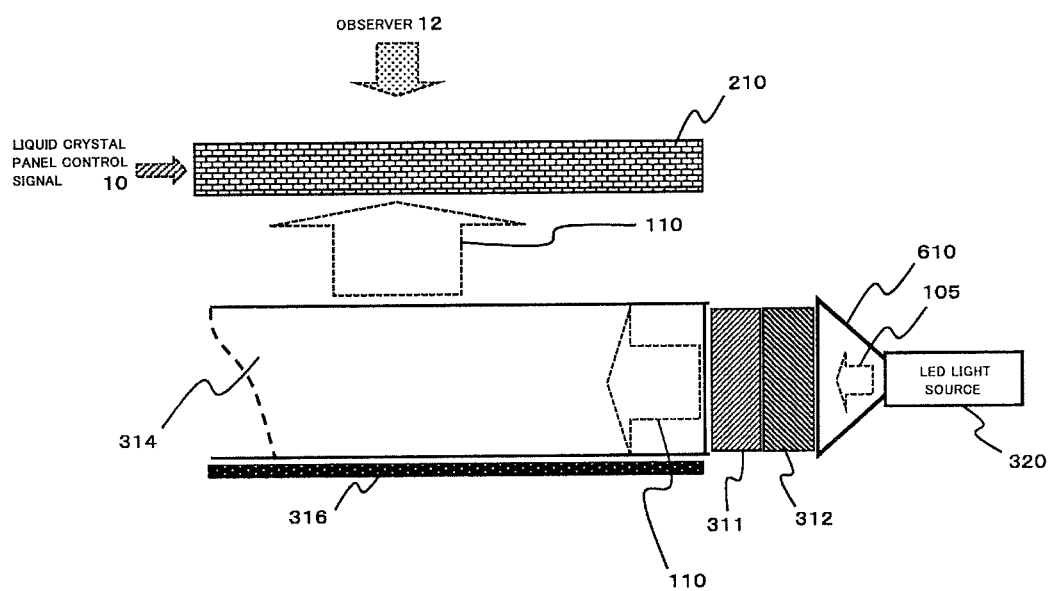
FIG. 9 is a diagram illustrating a specific method of mounting an LED light source, a fluorescent substance layer, and a backlight light-guiding portion in a liquid crystal display device according to a fourth embodiment of the invention.

FIG. 9 is a diagram illustrating a fourth example of the invention. In the fourth example, a coupling portion between the LED light source (320), the fluorescent substance layers (311, 312), and the backlight light-guiding plate (314) is different from the above-described configuration, and a structure of a triangular prism (610), which is a simple structure, is illustrated instead of the convex lens column. Light (105), which is incident to the triangular prism (610) from the LED light source (320), spreads, and is incident to the fluorescent substance layers (311, 312) which is provided on a front surface of the triangular prism and include a quantum dot. In addition, the light is converted to white light (110), and is incident to the backlight light-guiding plate (314). As is the case with FIG. 3, the light is diffused in the backlight light-guiding plate, and is emitted in a direction in which the liquid crystal plane exists, and the liquid crystal panel (210) is irradiated with the light from a rear surface side thereof. In addition, when a liquid crystal control signal (10) or an image signal is input to the liquid crystal display panel from an external control circuit, image information is displayed on a screen of the liquid crystal display panel, and an observer (12) can view the image information. Further, as is the case with FIG. 7, the optical reflective plate (316) is provided on an opposite side of the backlight light-guiding plate (314).

Figure 10:
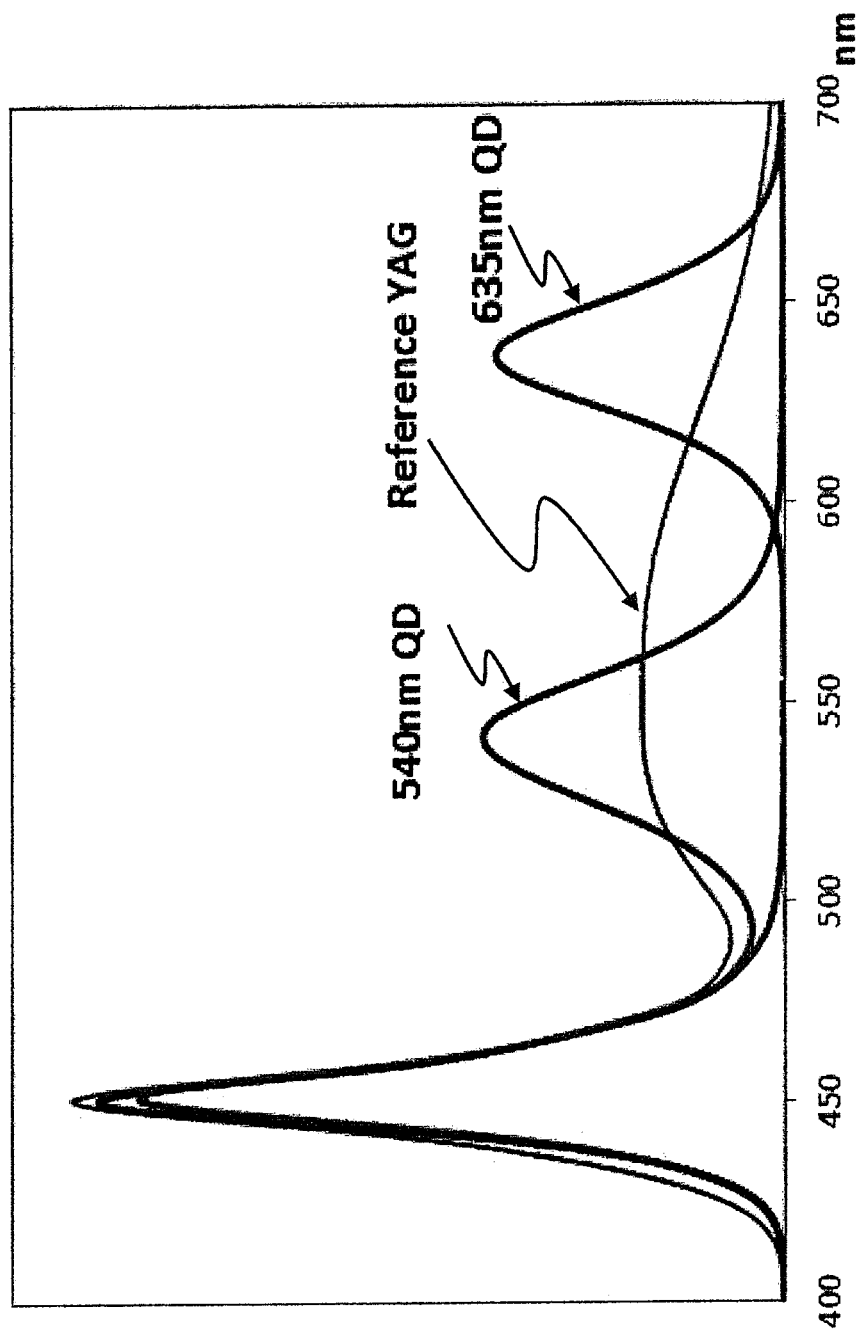
FIG. 10 is a diagram illustrating output intensity of light in a visible light region in a case where a light-emitting element constituted by a quantum dot that can be used in the invention, and a YAG element that is used in the related art are excited with ultraviolet light.

FIG. 10 is a diagram illustrating output intensity of light in a visible light region in a case where a light-emitting element constituted by a quantum dot that can be used in the invention, and a YAG element that is used in the related art are excited with ultraviolet light. 540 nmQD in the drawing represents output intensity of light in a case where a green luminescence light-emitting element, which is constituted by a quantum dot that can be used in the invention, is excited. In addition, 635 nmQD represents output intensity of light in a case where a red luminescence light-emitting element, which is constituted by the quantum dot that can be used in the invention, is excited. In addition, Reference YAG represents output intensity of light in a case where a YAG (yttrium aluminum garnet) element is excited. As illustrated in FIG. 10, a dope-type light-emitting element of the related art, a distribution of a light-emitting wavelength and the like are fixed in accordance with a kind of a dopant. On the other hand, according to the invention, wavelength conversion in accordance with a necessary wavelength is possible due to properties which are inherently provided to the quantum dot, and as a result, it is possible to significantly improve the light-emitting efficiency. Particularly, in a red region, the dope light-emitting element of the related art is poor in the light-emitting efficiency. However, in the invention, it is possible to significantly improve the light-emitting efficiency.

REFERENCE SIGNS LIST

10 LIQUID CRYSTAL PANEL CONTROL SIGNAL
12 OBSERVER OF LIQUID CRYSTAL PANEL INFORMATION
105 LIGHT (FOR EXAMPLE, BLUE WAVELENGTH) FROM LED LIGHT-EMITTING ELEMENT
110 WHITE LIGHT
200 LIQUID CRYSTAL DISPLAY PANEL (INCLUDING COLOR FILTER)
210 LIQUID CRYSTAL PANEL
300 FLUORESCENT SUBSTANCE LAYER INCLUDING PARTICLE HAVING PARTICLE SIZE OF SEVERAL MICROMETERS TO SEVERAL TENS OF MICROMETERS
301 FLUORESCENT SUBSTANCE LAYER (RED) INCLUDING PARTICLE HAVING PARTICLE SIZE OF SEVERAL MICROMETERS TO SEVERAL TENS OF MICROMETERS
302 FLUORESCENT SUBSTANCE LAYER (GREEN) INCLUDING PARTICLE HAVING PARTICLE SIZE OF SEVERAL MICROMETERS TO SEVERAL TENS OF MICROMETERS
310 FLUORESCENT SUBSTANCE LAYER INCLUDING QUANTUM DOT HAVING PARTICLE SIZE OF 50 nm OR LESS
311 FLUORESCENT SUBSTANCE LAYER INCLUDING QUANTUM DOT HAVING PARTICLE SIZE OF 50 nm OR LESS (RED)
312 FLUORESCENT SUBSTANCE LAYER INCLUDING QUANTUM DOT HAVING PARTICLE SIZE OF 50 nm OR LESS (GREEN)
314 BACKLIGHT LIGHT-GUIDING PLATE
316 LIGHT REFLECTIVE PLATE
320 LED LIGHT SOURCE (LED, BLUE LED)
340 LIGHT DIFFUSING PLATE
600 CONVEX LENS COLUMN (PLASTIC, GLASS, AND THE LIKE)
610 TRIANGULAR PRISM (PLASTIC, GLASS, AND THE LIKE)
800 QUANTUM DOT (FLUORESCENT SUBSTANCE PARTICLE) HAVING PARTICLE SIZE OF 50 nm OR LESS (RED)
801 QUANTUM DOT (FLUORESCENT SUBSTANCE PARTICLE) HAVING PARTICLE SIZE OF 50 nm OR LESS (GREEN)

The invention claimed is:
1. A liquid crystal display device, comprising:
a liquid crystal panel;
a light source component that includes a plurality of light sources;
a light-guiding plate which is provided on a rear surface of the liquid crystal panel and irradiates the liquid crystal panel with light that is derived from the light source component;
a fluorescent substance layer which is disposed between the light-guiding plate and the light source component and includes a quantum dot fluorescent substance having a diameter of 50 nm or less on an inner side of the fluorescent substance layer; and
a single convex lens column that changes a direction of light generated from the light source component, wherein the single convex lens column is provided between the light source component and the fluorescent substance layer, wherein only a convex surface of the single convex lens column faces the plurality of light sources such that no other surface of the single convex lens column faces the plurality of light sources, and
wherein the fluorescent substance layer comprises a plurality of stacked fluorescent substance layers in which a wavelength of light, which is obtained through wavelength conversion, is different for each of the plurality of stacked fluorescent substance layers, and
wherein the single convex lens column is provided for the plurality of light sources, and
wherein each light source of the plurality of light sources has a same color, and wherein the lights emitted from the light sources are first converted into green, and then are converted into red, when passing through the fluorescent substance layers, and
wherein the plurality of stacked fluorescent substance layers includes at least five fluorescent substance layers.
2. The liquid crystal display device according to claim 1, wherein light from the light source component, of which a wavelength is converted by the fluorescent substance layer, is incident to at least one lateral surface of the light-guiding plate, and is scattered to the inside of the light-guiding plate to irradiate the liquid crystal panel with the light.
3. The liquid crystal display device according to claim 1, wherein the light source component comprises an LED.
4. A plurality of stacked fluorescent substance layers that is applied to a liquid crystal display device including a liquid crystal panel, a light source component that includes a plurality of light sources, a light-guiding plate which is provided on a rear surface of the liquid crystal panel and irradiates the liquid crystal panel with light that is derived from the light source component, and a single convex lens column that changes a direction of light generated from the light source component, wherein the single convex lens column is provided between the light source component and the plurality of stacked fluorescent substance layers, wherein only a convex surface of the single convex lens column faces the plurality of light sources such that no other surface of the single convex lens column faces the plurality of light sources, the plurality of stacked fluorescent substance layers being disposed between the light-guiding plate and the light source component,
wherein the plurality of stacked fluorescent substance layers contains a quantum dot fluorescent substance having a diameter of 50 nm or less at an inner side of the plurality of stacked fluorescent substance layers,
wherein the plurality of stacked fluorescent substance layers having a wavelength of light, which is obtained through wavelength conversion, is different for each of the plurality of stacked fluorescent substance layers, and wherein the single convex lens column is provided for the plurality of light sources, and wherein each light source of the plurality of light sources has a same color, and wherein the lights emitted from the light sources are first converted into green, and then are converted into red, when passing through the fluorescent substance layers, and wherein the plurality of stacked fluorescent substance layers includes at least five fluorescent substance layers.

5. The liquid crystal display device according to claim 1, wherein light from the light source component, of which a wavelength is converted by the fluorescent substrate layer, is incident to at least one lateral surface of the light-guiding plate, and the liquid crystal display device further comprises:

an optical reflective plate provided on a rear surface and three short sides of a backlight light-guiding plate that faces the liquid crystal panel.

* * * * *